United States Patent [19]

Huber-Emden

[11] 3,927,126

[45] Dec. 16, 1975

[54] PROCESS FOR THE MANUFACTURE OF POLYFLUOROALCOHOLS AND THEIR USE

[75] Inventor: Helmut Huber-Emden, Basel, Switzerland

[73] Assignee: Ciba-Geigy AG, Basel, Switzerland

[22] Filed: Feb. 16, 1973

[21] Appl. No.: 333,246

[30] Foreign Application Priority Data

Feb. 22, 1972 Switzerland.......................... 2552/72

[52] U.S. Cl. ............... 260/633; 117/124; 117/126; 117/127; 117/132; 117/138.5; 117/139.5; 117/142; 117/154; 260/973; 260/983
[51] Int. Cl.$^2$........................................ C07C 31/34
[58] Field of Search..................... 260/633, 973, 983

[56] References Cited
UNITED STATES PATENTS

| | | | |
|---|---|---|---|
| 2,725,394 | 11/1955 | Zenftman et al. ................... | 260/983 |
| 2,866,807 | 12/1958 | Bayer et al..................... | 260/983 X |
| 2,929,833 | 3/1960 | Orloff et al. ......................... | 260/983 |
| 2,960,527 | 11/1960 | Grunze et al. ...................... | 260/973 |
| 3,059,016 | 10/1962 | Witt................................ | 260/983 X |
| 3,254,142 | 5/1966 | Oertel et al..................... | 260/633 X |

OTHER PUBLICATIONS

Grunze, Ber 92, (1959), 850–854.
Kosolapoff, Organophosphorous Compounds, John Wiley, New York, (1950), 70, 71, 139, 223.

*Primary Examiner*—Howard T. Mars
*Attorney, Agent, or Firm*—Joseph G. Kolodny; Prabodh I. Almaula; Edward McC. Roberts

[57] ABSTRACT

A new process for the manufacture of polyfluoroalcohols is provided. The polyfluoroalcohols correspond to the formula

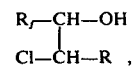

wherein $R_f$ is a perfluorinated hydrocarbon radical with 1 to 22 carbon atoms, and $R_1$ hydrogen, methyl, or hydroxymethyl. They are obtained from phosphorus-containing polyfluoro-compounds of the formula

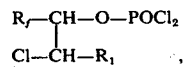

wherein $R_1$ is hydrogen, methyl or $-CH_2-O-POCl_2$ by hydrolysis with water or water donating compounds. The polyfluoroalcohols are useful as oil-repellants for various substrates or as intermediates for the manufacture of oil-repellants.

7 Claims, No Drawings

PROCESS FOR THE MANUFACTURE OF POLYFLUOROALCOHOLS AND THEIR USE

The present invention relates to a process for the manufacture of polyfluoroalcohols of the formula $$(1) \quad \begin{array}{c} R_f\text{---}CH\text{---}OH \\ | \\ Cl\text{---}CH\text{---}R \end{array},$$

wherein $R_f$ represents a perfluorinated hydrocarbon radical with 1 to 22, preferably 1 to 16, carbon atoms, and R represents a hydrogen atom, a methyl group or a hydroxymethyl group, wherein phosphorus-containing polyfluoro compounds of the formula $$\begin{array}{c} R_f\text{---}CH\text{---}O\text{---}POCl_2 \\ | \\ Cl\text{---}CH\text{---}R_1 \end{array}$$

in which $R_f$ has meaning given hereinabove and $R_1$ represents hydrogen, methyl or the radical of the formula
$$-CH_2-O-POCl_2$$
are hydrolysed with water or water donating compounds.

The perfluorinated hydrocarbon radical can be, for example, a straight-chain or a branched perfluoroalkyl radical with 4 to 17 carbon atoms and corresponds more or less to the following formulae:

| | |
|---|---|
| $F(CF_2)_p$— | $p = 4$–17, preferably 4–15, |
| $(CF_3)_2CF(CF_2)_q$— | $q = 1$–14, preferably 1–12, |
| $CF[CF_2CF(CF_3)]_r$— | $r = 1$–5 |
| $(CF_3)_2CF[CF_2CF(CF_3)]_s$— | $s = 1$–4 | w-H-perfluoroalkyl radicals are also possible.

Particular interest attaches to polyfluoroalcohols of the formula $$(2) \quad \begin{array}{c} F(CF_2)_n\text{---}CH\text{---}OH \\ | \\ Cl\text{---}CH\text{---}R \end{array}$$

wherein R represents a hydrogen atom, a methyl group or a hydroxymethyl group, and $n$ is an integer from 4 to 14.

Also suitable are polyfluoroalcohols of the formula $$(3) \quad \begin{array}{c} F(CF_2)_{n_1}\text{---}CH\text{---}OH \\ | \\ Cl\text{---}CH\text{---}R \end{array}$$

wherein R has the indicated meaning and $n_1$ is an integer from 6 to 12, and also those of the formula $$(4) \quad \begin{array}{c} F(CF_2)_{n_2}\text{---}CH\text{---}OH \\ | \\ Cl\text{---}CH_2 \end{array}$$

wherein $n_2$ is the integer 6, 8, 10 or 12.

These compounds therefore correspond to the formula $$(4.1) \quad \begin{array}{c} F(CF_2)_6\text{---}CH\text{---}OH \\ | \\ Cl\text{---}CH_2 \end{array}$$

$$(4.2) \quad \begin{array}{c} F(CF_2)_8\text{---}CH\text{---}OH \\ | \\ Cl\text{---}CH_2 \end{array} \quad \text{and}$$

$$(4.3) \quad \begin{array}{c} F(CF_2)_{10}\text{---}CH\text{---}OH \\ | \\ Cl\text{---}CH_2 \end{array}$$

Particularly valuable polyfluoroalcohols are also those of the formulae $$(5.1) \quad \begin{array}{c} F(CF_2)_6\text{---}CH\text{---}OH \\ | \\ Cl\text{---}CH\text{---}CH_3 \end{array},$$

$$(5.2) \quad \begin{array}{c} F(CF_2)_8\text{---}CH\text{---}OH \\ | \\ Cl\text{---}CH\text{---}CH_3 \end{array},$$

$$(6.1) \quad \begin{array}{c} F(CF_2)_6\text{---}CH\text{---}OH \\ | \\ Cl\text{---}CH\text{---}CH_2OH \end{array} \quad \text{and}$$

$$(6.2) \quad \begin{array}{c} F(CF_2)_8\text{---}CH\text{---}OH \\ | \\ Cl\text{---}CH\text{---}CH_2OH \end{array}$$

The polyfluoroalcohols are obtained preferably by hydrolysis of phosphorus containing perfluoro compounds of the formula $$(8) \quad \begin{array}{c} F(CF_2)_n\text{---}CH\text{---}O\text{---}POCl_2 \\ | \\ Cl\text{---}CH\text{---}R_1 \end{array}$$

wherein $R_1$ represents a hydrogen atom, a methyl group or the radical of the formula
$$-CH_2-O-POCl_2$$
and $n$ is an integer from 4 to 14.

Further particularly valuable phosphorus-containing polyfluoro compounds which can be used for the manufacture of polyfluoroalcohols, correspond to the formulae $$(9) \quad \begin{array}{c} F(CF_2)_{n_1}\text{---}CH\text{---}O\text{---}POCl_2 \\ | \\ Cl\text{---}CH\text{---}R_1 \end{array},$$

wherein $R_1$ has the indicated meaning and $n_1$ is an integer from 6 to 12, $$(10) \quad \begin{array}{c} F(CF_2)_{n_2}\text{---}CH\text{---}O\text{---}POCl_2 \\ | \\ CH_2Cl \end{array},$$

wherein $n_2$ is the integer 6, 8, 10 or 12, $$(11) \quad \begin{array}{c} F(CF_2)_8\text{---}CH\text{---}O\text{---}POCl_2 \\ | \\ Cl\text{---}CH\text{---}CH_3 \end{array} \quad \text{and}$$

$$(12) \quad \begin{array}{c} F(CF_2)_6\text{---}CH\text{---}O\text{---}POCl_2 \\ | \\ Cl\text{---}CH\text{---}CH_2\text{---}O\text{---}POCl_2 \end{array}$$

The appropriate procedure for manufacturing the polyfluoroalcohols is to suspend the phosphorus-containing polyfluoro compound in water with stirring, and then to carry out the hydrolysis at the boiling temperature of the water. During the course of the reaction, the suspended reaction mixture forms initially a viscous solution; and towards the end of the reaction a fluid one.

The reaction velocity of the hydrolysis of the phosphorus-containing polyfluoro starting compounds depends very greatly on the temperature. In boiling water and under normal pressure, the hydrolysis lasts about 100 hours or more in order to obtain a good yield of polyfluoroalcohols. However, the reaction time can be substantially reduced by the application of higher temperatures in pressure vessels. The temperature range is between about 100° and 180°C. Another suitable method is to use as hydrolysis medium high boiling compounds which split off water under strongly acid conditions. Examples of such high boiling compounds are ethylene glycol, dihydroxypropane-1,2, or glycerol.

The reaction product is precipitated from the reaction medium as an oily phase or in the form of a wax-like substance. For processing, the water or glycol is decanted off and the reaction product is washed with hot water until it shows neutral reaction. It is also possible to pre-purify it by steam distillation. In this state, the reaction products still contain slight amounts of water and other impurities. They can be obtained in pure form by means of vacuum distillation or sublimation.

The polyfluoroalcohols are valuable intermediates for the manufacture of oil repellants. But they can also be used themselves as oil repellants and are used, for example, for giving oleophobic finishes to porous and nonporous substrates by either incorporating them into the particular material or applying them to its surface.

By porous substrates are meant, for example, leather and paper, but preferably textile fibres; wheras suitable non-porous materials, besides glass, are especially metals and plastics.

Textile fibre materials claim particular interest for the finishing with the polyfluoroalcohols. Such materials include, for example, those made from natural or regenerated cellulose, such as cotton, linen or rayon, staple fibre or cellulose acetate; also from wool, synthetic polyamides, polyesters or acrylonitrile and the corresponding fibre blends. The textiles can be in the form of threads, fibres and flocks, but preferably of woven or knitted fabrics.

The polyfluoroalcohols are applied from oranic solvent liquors by means of known processes, e.g., by the pad or immersion process.

Suitable solvents for the application are, for example, solvents which are immiscible, or only sparingly miscible, with water, such as benzene and benzenes which are halogenated or substituted with low molecular alkyl groups, e.g., toluene, xylene, ethylbenzene, cumene, mono- and dichlorobenzene, but preferably halogenated hydrocarbons, e.g., the solvents trichloroethylene and perchloroethylene used in the dry cleaning industry, also chloroform, methylene chloride, carbon tetrachloride, dibromoethylene and the chlorinated ethanes, such as 1,1-dichloroethane, 1,2-dichloroethane, 1,1,1-trichloroethane and 1,1,2,2,-tetrachloroethane. The water-miscible solvents form another group including, e.g., ketones. such as acetone, methyl ethyl ketone, cyclohexanone, ethers and acetals, such as diisopropyl ether, diphenylene oxide, dioxan, tetrahydrofuran; also pyridine, acetonitrile, ethylene carbonate, γ-butyrolactone, N,M-dimethyl formamide, N,N-dimethyl acetamide, N-methylpyrrolidone, tetramethyl urea, tetramethylene sulphone. Mixtures of the cited solvents can also be used.

Preparations which contain the polyfluoroalcohols can also contain further suitable additives, e.g., tertiary amines, which are able to improve the reaction between the finishing agent and the substrate. Suitable additives are aliphatic and aromatic amines, for example trimethylamine, triethylamine or pyridine, which are applied in an amount of 1 to 5 moles, preferably 1 mole to 3 moles, relative to the amount of reaction product to be applied.

The temperature range for the application is generally between 20° and 110°C, preferably between 40° and 80°C. The treatment times are generally between 1 and 30 minutes, preferably between 5 and 15 minutes.

The amounts in which the polyfluoroalcohols are applied can vary within wide limits and, in the padding process, amounts to, e.g., 0.1 to 10%, relative to the impregnating liquor, or, e.g., 0.1 to 10%, preferably 0.5 to 5%, relative to the fibre material, if the immersion process is followed.

The substrates treated in this way display a good oil repellency. It is also possible to produce a soil release and antisoiling effect with the polyfluoroalcohols.

The oil repellent can be applied in one operation either alone or together with the application of further finishing agents, in so far as these can be applied from organic solvents.

The following Examples illustrate the invention, the parts and percentages being by weight unless otherwise stated.

EXAMPLE 1

3.75 g of phosphoric acid -(1-n-perfluoro-octyl-2-chloro)ethyl ester dichloride in 40 ml of water are refluxed for 160 hours in a 500 liter flask. The bath temperature is 120°C. At the onset of the reaction vigorous foaming occurs. Within about 1 to 2 hours a clear reaction solution is obtained which is initially viscous, but becomes fluid towards the end of the reaction. The reaction product is precipitated during the reaction in the reflux cooler in the form of a gelatin-like substance. It is periodically removed from the cooler and collected. For processing, the reaction product is stirred in 50 ml of hot (90°C) water, in the process of which it melts and is precipitated as a heavy oily phase, which congeals on cooling. The water is decanted off and the reaction product is dried between filter paper.

Yield: 2.4 g (79% of theory). Melting point: 60°–61°C.

The product is further purified by distillation in a saber flask (b.p. 104°C/16 Torr) or by sublimation at a temperature of about 50° to 55°C/0.001 Torr, to give the compound of the formula (4.2.).

Melting point: 54°–55°C.

Analysis: $C_{10} H_4 Cl F_{17} O$: Calculated: C, 24.1; H, 0.8; Cl, 7.1. Found: C, 24.3; H, 1.0; Cl 6.8.

EXAMPLE 2 a. 3.75 g of phosphoric acid-(1-n-perfluoro-octyl-2-chloro)ethyl ester dichloride are dissolved with heating in 20 ml of water and the solution is shaken in a Carius tube for 25 hours at 140°C. Upon cooling, the water is decanted off from the congealed reaction product. The product is stirred with hot water until it shows neutral reaction, in the process of which it melts and then congeals again on cooling. It is dried with filter paper to give 3.45 g of crude product which melts at 62°–63°C.

Sublimation at 55°C/0.001 Torr yields 2.7 g (89%) of theory of the compound of the formula (4.2).

b. In a modification of process (a), hydrolysis is carried out for 20 hours at 160°C.

Sublimation yields 2.6 g (85.6% of theory) of the compound of the formula (4.2).

c. In accordance with process (a), phosphoric acid-(1-n-perfluorohexyl-2-chloro)-ethyl ester dichloride and phosphoric acid-(1-n-perfluorodecyl-2-chloro)- ethyl ester dichloride are hydrolysed for 50 hours at 140°C in a Carius tube.

The following perfluoroalcohols are obtained:

|  | Melting Point | Boiling Point | Yield |
|---|---|---|---|
| (4.1) $F(CF_2)_6$—CH—OH<br>$\quad\quad\quad\quad\quad$ $\mid$<br>$\quad\quad\quad\quad\quad$ $CH_2Cl$ | 27°C | 80°C/12 Torr | 87.4% |
| (4.3) $F(CF_2)_{10}$—CH—OH<br>$\quad\quad\quad\quad\quad\quad$ $\mid$<br>$\quad\quad\quad\quad\quad\quad$ $CH_2Cl$ | 92–93°C | — | 88.6% |

The yield refers to products obtained after the sublimation or distillation.

EXAMPLE 3 a. 5.3 g of phosphoric acid-(1-n-perfluorohexyl-2-chloro)-propyl ester dichloride are dissolved in 25 ml of water by stirring. The solution is shaken in a Carius tube for 50 hours at 140°C. The oily reaction product which is precipitated after the solution has cooled is washed neutral with water and subsequently distilled. (Boiling point: 78°–80°C/12 Torr).

Yield: 3.3 g (80% of theory) of the compound of the formula (5.1).

Analysis: $C_9H_6ClF_{13}O$: Calculated: C, 26.2; H, 1.5; Cl, 8.6. Found: C, 26.4; H, 1.3; Cl, 8.5.

b. In accordance with process (a), the homologous alcohol of the formula (5.2) is manufactured from phosphoric acid-(1-n-perfluoro-octyl-2-chloro)-propyl ester dichloride.

Yield: 85.5% of theory. Melting point: 62°C; boiling point: 125°C/50 Torr.

The reaction product is purified by sublimation at 57°C/0.001 Torr.

EXAMPLE 4 a. 6.17 of a homologue mixture of the formula (101) $\quad\quad F(CF_2)_t$—CH—O—$\overset{\overset{\displaystyle O}{\|}}{P}Cl_2$
$\quad\quad\quad\quad\quad\quad\quad$ $\mid$
$\quad\quad\quad\quad\quad\quad\quad$ $CH_2Cl$ with the composition

| t | 6 | 8 | 10 | 12 |
|---|---|---|---|---|
| mol % | 23.5 | 43.6 | 25.4 | 1.3 | are dissolved in 25 ml of water with heating and the solution is subsequently shaken in a Carius tube for 50 hours at 140°C. Distillation (b.p. 74°–112°C/10 Torr) yields a homologous alcohol mixture of the formula (102) $\quad\quad F(CF_2)_t$—CH—OH
$\quad\quad\quad\quad\quad\quad\quad$ $\mid$
$\quad\quad\quad\quad\quad\quad\quad$ $CH_2Cl$ Yield: 4.45 g (88.9% of theory).

b. 410 g of a homologue mixture (103) $\quad\quad F$—$(CF_2)_{t_1}$—CH—O—$\overset{\overset{\displaystyle O}{\|}}{P}Cl_2$
$\quad\quad\quad\quad\quad\quad\quad\quad$ $\mid$
$\quad\quad\quad\quad\quad\quad\quad\quad$ $CH_2Cl$ with $t_1 = 6, 8, 10$ and 470 ml of ethylene glycol are stirred under reflux for 18 hours at 140°C.

The two phase reaction mixture is allowed to settle well and the upper phase is removed. The lower phase is treated with 300 ml of water and stirred for 3 hours at 75°C. After the mixture has been allowed to settle and cool, the upper aqueous phase is removed and the lower, solid phase is distilled in a saber flask, to yield 313.6 g (94.2% of theory) of the perfluoroalkyl-chlorohydrin homologue mixture of the formula (104) $\quad\quad F(CF_2)_t$—CH—OH
$\quad\quad\quad\quad\quad\quad\quad$ $\mid$
$\quad\quad\quad\quad\quad\quad\quad$ $CH_2Cl$ which boils in the range 76°–138°C/17 Torr. The composition determined by gas chromatography is:

| t | 6 | 8 | 10 |
|---|---|---|---|
| % | 20.3 | 49.4 | 28.6 |

EXAMPLE 5 a. While stirring thoroughly, 24.6 g of phosphoric acid-(1-n-perfluoro-octyl-2-chloro)-ethyl ester dichloride together with 80 ml of ethylene glycol are heated for 7 hours to 140°C (bath temperature) using a reflux cooler. The reaction mixture remains two phase to the end.

The lower phase is isolated and washed 6 times with 40 ml of hot water on each occasion (until its melting point is 61°–63°C after cooling).

Yield: 18.65 g (product contains water of crystallisation). The product is purified by sublimation to yield 18.2 g (90.7% of theory) of the compound (4.2) which melts at 55°–56°C.

b. 200 g of phosphoric acid-(1-n-perfluoro-octyl-2-chloro)-ethyl ester dichloride together with 200 ml of ethylene glycol are thoroughly stirred under reflux for 17 hours at 140°C. The reaction mixture is allowed to settle while heating, then cooled, and the upper phase of the two phase reaction mixture is decanted off. The lower phase is stirred three times with 200 ml of water on each occasion for 2 hours at 75°C. Upon cooling, the lower phase becomes solid. It is dried on the surface with filter paper and purified by sublimation at 55°C/0.001 Torr, to yield 149.2 g (92.2% of theory) of compound (4.2). Melting point: 56°–57°C.

c. In accordance with process a), 3.15 g of phosphoric acid-(1-n-perfluoro-octyl-2-chloro)-propyl ester dichloride are hydrolysed.

Yield: (after washing with hot water) 2.5 g (97.5% of theory). Melting point: 60°–61°C.

Yield: (after sublimation at 55°C/0.001 Torr) 2.35 g (91.7% of theory). Melting point: 62°C.

The resulting compound corresponds to the formula (5.2).

EXAMPLE 6

6.62 g of a bifunctional phosphoric acid monoester dichloride of the formula (12) are dissolved with heating in 60 ml of water and the solution is subsequently shaken in a Carius tube for 50 hours at 140°C.

The reaction product is precipitated as a wax-like substance. It is isolated and purified by steam distillation. The distillation is extracted with ether and the ether phase is dried over sodium sulphate. The solvent is removed to yield a wax-like product which is further purified by sublimation at 65°C/0.01 Torr. A reaction product of the formula (6.1) is obtained.

Melting point: 76°C.
Yield: 2.25 g (52.6% of theory).
Analysis: Calculated: C, 25.2; H, 1.4; active, H, 0.47. Found: C, 25.6; H, 1.3; active H, 0.47.

EXAMPLE 7

A piece of cotton and woolen fabric is each impregnated with a 5% solution of the polyfluoroalcohols according to Example 4 in dry chloroform, lightly squeezed out and dried at room temperature. The samples treated in this way are tested for their oil repellency. The oil repellency is evaluated by the 3 M oil repellency test (Crajech, Petersen, Textile Research Journal 32, 320–331, 1960) with heptance-Nujol mixtures. The highest rating which can be attained in the evaluation is 150. The results are as follows:

|  | Rating |
|---|---|
| untreated fabric | 0 |
| cotton | 120 |
| wool | 130 |

I claim:
1. A process for the manufacture of polyfluoroalcohols of the formula

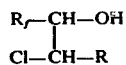

in which $R_f$ represents perfluorinated alkyl of 1 to 22 carbon atoms and R represents hydrogen, methyl or hydroxymethyl, wherein phosphorus-containing polyfluoro compounds of the formula

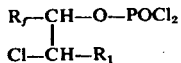

in which $R_f$ has the meaning given hereinabove and $R_1$ represents hydrogen, methyl or the radical of the formula
$-CH_2 - O - POCl_2$
are hydrolysed in a high boiling water donating compound selected from the group consisting of ethylene glycol, dihydroxy propane-1,2 and glycerol at temperatures of 100° to 180°C.

2. A process according to claim 1, wherein phosphorus-containing polyfluoro compounds which contain a straight-chain or branched perfluoroalkyl radical with 4 to 17 carbon atoms are hydrolysed.

3. A process according to claim 1, wherein phosphorus-containing polyfluoro compounds of the formula

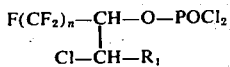

in which $R_1$ represents hydrogen, methyl or the radical of the formula
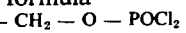
and $n$ is an integer from 4 to 14, are hydrolysed.

4. A process according to claim 3, wherein phosphorus-containing polyfluoro compounds of the formula

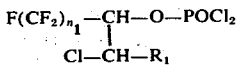

in which $R_1$ has the indicated meaning and $n_1$ is an integer from 6 to 12, are hydrolysed.

5. A process according to claim 4, wherein phosphorus-containing polyfluoro compounds of the formula

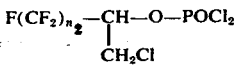

in which $n_2$ is the integer 6, 8, 10 or 12, are hydrolysed.

6. A process according to claim 5, wherein phosphorus-containing polyfluoro compounds of the formula

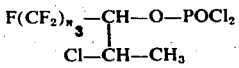

in which $n_3$ is the integer 6 or 8, are hydrolysed.

7. A process according to claim 5, wherein phosphorus-containing polyfluoro compounds of the formula

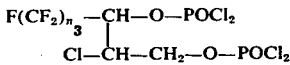

in which $n_3$ is the integer 6 or 8, are hydrolysed.

* * * * *